Patented Dec. 5, 1939

2,182,512

UNITED STATES PATENT OFFICE 2,182,512

POLYMERIZATION OF OLEFINS

John A. Anderson, Olympia Fields, Ill., assignor to Standard Oil Company, Chicago, Ill., a corporation of Indiana No Drawing. Application June 10, 1937, Serial No. 147,491

6 Claims. (Cl. 260—94)

This invention relates to the polymerization of olefins and particularly to the polymerization of isobutylene in the presence of active metal halide catalysts such as aluminum chloride, aluminum bromide, boron trifluoride, antimony pentachloride and in general those metal halides which hydrolyze in water. The invention relates more particularly to the conversion into high molecular weight products, including resins and lubricating oils, of isobutylene contained in hydrocarbon mixtures.

A specific object of the invention is to provide a method for treating mixtures of isobutylene and other hydrocarbons and olefins preliminarily to the polymerization step to remove therefrom undesirable olefinic hydrocarbons, especially diolefins, which adversely affect the quality of the isobutylene polymerization products. I have discovered that the presence of diolefins in isobutylene mixtures has the effect of reducing the molecular weight of the isobutylene polymer produced by the action of the aforesaid active metal halide catalyst. In addition, I have found that the presence of diolefins results in the formation of viscous products which, when blended with lubricating oils, produce blends of lower viscosity index than when the diolefins are absent during the isobutylene polymerization. High boiling diolefins may be removed by distillation, and this invention is concerned chiefly with the polymerization of isobutylene in hydrocarbon mixtures of low boiling range, about the boiling range of the butanes and butylenes. The contamination of such hydrocarbon mixtures by butadiene has been discovered to be an important reason for the formation of undesirable low molecular weight low viscosity polymerization products from said mixtures in comparison with the products obtained from the polymerization of pure isobutylene.

As an example of the effect of diolefins in the polymerization of isobutylene, a mixture of hydrocarbons containing about 32% of isobutylene and about 6% of isoprene was treated for one hour at —75° F. with boron fluoride. The product was neutralized, washed and distilled to remove unreacted hydrocarbons, leaving a residue of water-white viscous resin in an amount equal to the weight of isobutylene in the mixture. The operation was then exactly repeated in the absence of isoprene, again giving a yield of 100% based on the weight of isobutylene charged. The products from each operation were tested for their effect in increasing the viscosity index of lubricating oil with the following results:

|  | Viscosity Saybolt— | | Viscosity index |
|---|---|---|---|
|  | At 100° F. | At 210° F. |  |
| Lubricating oil stock | 162 | 44.3 | 100 |
| Lubricating oil stock + 2% isobutylene resin with isoprene | 177 | 45.1 | 102 |
| Lubricating oil stock + 2% isobutylene resin without isoprene | 221 | 49.5 | 118 |

It will be noted that both viscosity and viscosity index are considerably more increased by the resin made in the absence of isoprene and, in fact, the viscosity index of the resin from isoprene contaminated isobutylene was hardly greater than the viscosity index of the original oil.

According to the present invention, isobutylene-containing hydrocarbon mixtures contaminated with diolefins which may be obtained from cracking still gases, for example, are initially treated with a reagent, hereinafter called a 'diolefin remover', which will destroy or remove the diolefins without affecting the isobutylene. The butane fraction of said gases may be separated by fractionation under pressure and liquefied, and will usually contain from 10 to 30% of isobutylene. As examples of such diolefin removers I may employ the alkali metals, particularly sodium and potassium, maleic anhydride, the peroxides, such as hydrogen peroxide, barium peroxide, sodium peroxide and the organic peroxides such as benzoyl and acetyl peroxides, heated fuller's earth and similar adsorbent catalysts. The severity of the fuller's earth treatment is regulated to avoid loss of isobutylene. When using peroxides the liquid is allowed to stand with about 0.1 to 2% of acetyl peroxide, for example for several days or weeks until the diolefins have been converted to high boiling compounds. After this treatment I prefer to redistil the hydrocarbon mixture, but I may omit the redistillation in some cases.

As an example of my process about 155 parts by weight of hydrocarbon mixture containing about 15% of isobutylene and about 3.5% of diolefins was agitated, under a pressure of about 500 pounds, for 12 hours at 280° F. with 30 parts by weight of sodium shavings. The hydrocarbon gas was then distilled from the reaction bomb at room temperature and condensed. The residue in the reaction bomb yielded 3.5 parts by weight of a dark red solid which was soluble in benzol. The distillate, consisting of about 140 parts by weight, was cooled to −75° F. and treated for a period of two hours with $BF_3$ introduced as a gas. The amount of $BF_3$ added was about 2% but the amount of catalyst employed may conveniently vary from 0.2 to 5% of the weight of isobutylene present. Alcohol was added to the cold reaction mixture to remove the catalyst, after which the hydrocarbon solution of the product was neutralized with sodium hydroxide and washed with water. Unchanged light hydrocarbons were distilled from the product and about 26 parts by weight of a colorless heavy oil was obtained as a residue. This residue was further purified by dissolving in about 40 parts by weight of benzol and precipitating with about 40 parts by weight of acetone. The precipitate, consisting of 10.5 parts by weight equal to about 7% yield of the original isobutylene solution, was a plastic, colorless, tacky, semi-solid polymer. When added to lubricating oils in small amounts of about 2% its effect in increasing the viscosity and viscosity index was fully equal to or better than that of the polymer obtained from isobutylene solutions free from contaminating diolefins.

In this example I have described conducting the polymerization at a low temperature, and I prefer to employ low temperatures for the polymerization reaction, as low temperatures have been found to give products of higher molecular weight which are plastic solids rather than oils. The molecular weight of these products will usually be above 1,000 and may be as high as 12,000 to 25,000. The preferred temperatures for making these plastic solid products are below −40° F. and usually in the range of −40 to −100° F. However, my invention is not limited to the manufacture of these solid resinous products only, but may also be applied to polymerization at higher temperatures, for example from −40° F. to 100° F. When conducting the process at these higher temperatures the products are chiefly heavy oils rather than plastic solids.

Having thus described my invention, what I claim is:

1. In the process of producing plastic hydrocarbon polymers having a molecular weight above about 1000 by the polymerization of isobutylene contained in hydrocarbon mixtures from cracking still gases which also contain a small amount of diolefins wherein said hydrocarbon mixtures are subjected to the action of an active metal halide catalyst at a low temperature of about −40 to −100° F., the method of increasing the molecular weight and plasticity of said polymers which comprises removing said diolefins from said hydrocarbon mixtures before subjecting them to the polymerizing action of said active metal halide catalyst by treating said hydrocarbon mixtures with a reagent which reacts with said diolefins but allows said isobutylene and other hydrocarbons present in said mixtures to remain substantially unaffected.

2. The process of claim 1 wherein said reagent which reacts with said diolefins is an alkali metal.

3. The process of claim 1 wherein said reagent which reacts with said diolefins is a peroxide.

4. The process of claim 1 wherein the said reagent which reacts with said diolefins is maleic anhydride.

5. The process of claim 1 wherein the said diolefins are chiefly butadiene.

6. The process of claim 1 wherein the concentration of isobutylene in said hydrocarbon mixtures is between about 10 and 30%.

JOHN A. ANDERSON.